United States Patent
Kainulainen et al.

(10) Patent No.: US 9,052,376 B2
(45) Date of Patent: Jun. 9, 2015

(54) INDOOR POSITIONING METHOD, APPARATUS AND SYSTEM

(75) Inventors: Antti Paavo Tapani Kainulainen, Espoo (FI); Kimmo Heikki Juhana Kalliola, Helsinki (FI); Ville Valtteri Ranki, Espoo (FI); Hannu Pekka Kauppinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 484 days.

(21) Appl. No.: 12/740,634

(22) PCT Filed: Oct. 29, 2007

(86) PCT No.: PCT/EP2007/009360
§ 371 (c)(1),
(2), (4) Date: Apr. 29, 2010

(87) PCT Pub. No.: WO2009/056150
PCT Pub. Date: May 7, 2009

(65) Prior Publication Data
US 2010/0259450 A1  Oct. 14, 2010

(51) Int. Cl.
*G01S 5/02* (2010.01)
*G01S 1/08* (2006.01)
*G01S 5/08* (2006.01)

(52) U.S. Cl.
CPC ... *G01S 5/02* (2013.01); *G01S 1/08* (2013.01); *G01S 5/08* (2013.01); *G01S 5/0257* (2013.01)

(58) Field of Classification Search
USPC .................. 342/386, 432–434, 436, 451, 464
IPC .................. G01S 1/08,3/72, 5/02, 5/0257, 5/08
See application file for complete search history.

(56) References Cited

U.S. PATENT DOCUMENTS

| | | | | |
|---|---|---|---|---|
| 2,836,816 A | * | 5/1958 | Allison et al. | 342/452 |
| 3,746,846 A | * | 7/1973 | Weihe | 342/452 |
| 3,838,427 A | * | 9/1974 | King et al. | 342/401 |
| 3,958,244 A | * | 5/1976 | Lee et al. | 342/402 |
| 5,740,048 A | * | 4/1998 | Abel et al. | 701/470 |
| 6,064,340 A | * | 5/2000 | Croft et al. | 342/460 |
| 6,195,046 B1 | * | 2/2001 | Gilhousen | 342/457 |
| 6,321,092 B1 | * | 11/2001 | Fitch et al. | 455/456.5 |
| 6,437,739 B1 | * | 8/2002 | Schulte et al. | 342/401 |
| 6,842,444 B2 | | 1/2005 | Bolgiano et al. | |

(Continued)

FOREIGN PATENT DOCUMENTS

| | | |
|---|---|---|
| EP | 0937368 A1 | 8/1999 |
| EP | 1 329 737 A2 | 7/2003 |

(Continued)

OTHER PUBLICATIONS

J.M. Zagami et al., Providing universal location services using a wireless E911 location network, IEEE Communications Magazine, vol. 36(4), p. 66-71, 1998.*

(Continued)

*Primary Examiner* — Gregory C Issing
*Assistant Examiner* — Fred H Mull
(74) *Attorney, Agent, or Firm* — Alston & Bird LLP (57) ABSTRACT

A method, including: receiving, at an apparatus, first and second radio signals from a first location; discriminating the first and second radio signals, in order to estimate a bearing from the first location; and estimating, using the bearing and constraint information which is independent of the radio signals, a position of the apparatus.

21 Claims, 9 Drawing Sheets

(56) References Cited

U.S. PATENT DOCUMENTS

| | | | |
|---|---|---|---|
| 7,495,614 B2* | 2/2009 | Small | 342/458 |
| 8,179,318 B1* | 5/2012 | Furman et al. | 342/404 |
| 2001/0047229 A1* | 11/2001 | Staggs | 701/207 |
| 2002/0122003 A1 | 9/2002 | Patwari | |
| 2002/0167417 A1 | 11/2002 | Welles, II et al. | |
| 2003/0197645 A1* | 10/2003 | Ninomiya et al. | 342/464 |
| 2004/0162084 A1 | 8/2004 | Wang | |
| 2005/0135292 A1 | 6/2005 | Graumann | |
| 2005/0254608 A1 | 11/2005 | Lee et al. | |
| 2006/0087475 A1* | 4/2006 | Struckman | 342/451 |
| 2006/0148488 A1* | 7/2006 | Syrbe | 455/456.1 |
| 2006/0205417 A1* | 9/2006 | Ju et al. | 455/456.5 |
| 2006/0290499 A1 | 12/2006 | Chang | |
| 2007/0247367 A1 | 10/2007 | Anjum et al. | |
| 2008/0191941 A1 | 8/2008 | Saban et al. | |
| 2009/0082019 A1* | 3/2009 | Marsico | 455/435.2 |
| 2010/0183099 A1 | 7/2010 | Toda et al. | |
| 2010/0302102 A1 | 12/2010 | Desai et al. | |

FOREIGN PATENT DOCUMENTS

| | | | |
|---|---|---|---|
| EP | 1329737 A2 * | 7/2003 | |
| EP | 1731919 A | 12/2006 | |
| EP | 1786143 | 5/2007 | |
| EP | 2 110 965 A2 | 10/2009 | |
| JP | 2007-139521 A | 6/2007 | |
| JP | 2011-089947 A | 5/2011 | |
| WO | WO 2004/059251 A1 | 7/2004 | |
| WO | WO 2005/002070 A2 | 1/2005 | |
| WO | WO 2007/026137 A1 * | 3/2007 | |
| WO | WO-2007/145890 | 12/2007 | |
| WO | WO-2011/131745 | 10/2011 | |
| WO | WO 2012/008110 A1 | 1/2012 | |
| WO | WO 2012/042315 A1 | 4/2012 | |

OTHER PUBLICATIONS

P. Bahl et al., RADAR: an in-building RF-based user location and tracking system, Proceedings of the Nineteenth Annual Joint Conference of the IEEE Computer and Communications Societies, vol. 2, p. 775-784, 2000.*

M. Najar et al., Kalman Tracking for UMTS mobile location, IST Mobile Summit 2001, Sitges, Spain, Sep. 2001.*

S.K. Ghosh et al., A Hybrid Distance-measurement/Angle-of-arrival Approach to Localization, Telecommunication Networks and Applications Conference, p. 230-234, 2008.*

Communication for European Application No. 07 819 402.4 dated Nov. 18, 2010.

International Search Report for PCT Application No. PCT/EP2007/009360; Filed Oct. 29, 2007; Date of Completion Aug. 6, 2008; Date of Mailing Aug. 14, 2008.

Written Opinion for PCT Application No. PCT/EP2007/009360; Filed Oct. 29, 2007; Date of Completion Aug. 6, 2008; Date of Mailing Aug. 14, 2008.

Hamid Krim, et al., "Two Decades of Array Signal Processing Research," IEEE Signal Processing Magazine, Jul. 1996.

Kimmo Kalliola, "Experimental Analysis of Multi-Dimensional Radio Channels," Helsinki University of Technology Radio Laboratory Publications, Espoo, Report S 251, Feb. 2002.

Proposound Brochure, The Ultimate Technology in Radio Propagation Measurement, Undated.

Abdat, M., et al.; "Survey on indoor wireless positioning techniques: Towards adaptive systems;" International Conference n Distributed Framework for Multimedia Applications (DFmA); dated Aug. 2010.

Ferreres, A., et al.; "Guaranteeing the Authenticity of Local Information;" IEEE Pervasive Computing; vol. 7, No. 3; pp. 72-80; dated 2008.

Kemppi, P., et al.; "Hybrid positioning system combining angle-based localization, pedestrian dead reckoning and map filtering;" International Conference on Indoor Positioning and Indoor Navigation (IPIN); dated Sep. 2010.

Papapostolou, A. et al.; "Exploiting Multi-modality and Diversity for Localization Enhancement: WiFi & RFID usecase;" IEEE 20$^{th}$ International Symposium on Personal, Indoor and Mobile Radio Communication (PIMRC); dated Sep. 2009.

Singelee, D., et al.; "Location Verification using Secure Distance Bounding Protocols;" International Conference on Mobile Adhoc and Sensor System; dated Nov. 2005.

Vora, A., et al.; "Secure Location Verification Using Radio Broadcast;" IEEE Transactions on Dependable and Secure Computing; vol. 3, No. 4; pp. 377-385; dated Oct. 2006.

International Search Report and Written Opinion of the Search Authority for Application No. PCT/IB2011/055556; dated Sep. 21, 2012.

International Search Report and Written Opinion of the Search Authority for Application No. PCT/IB2011/052780; dated Sep. 28, 2012.

Search Report from European Patent Application No. 12192669, dated Dec. 18, 2012.

International Search Report and Written Opinion from International Application No. PCT/IB2011/055792, mailed Nov. 28, 2012.

International Search Report and Written Opinion from International Application No. PCT/IB2012/053340, mailed Nov. 21, 2012.

* cited by examiner

INDOOR POSITIONING METHOD, APPARATUS AND SYSTEM

FIELD OF THE INVENTION

Embodiments of the present invention relate to positioning. In particular, they relate to a method, an apparatus, a module, a chipset or a computer program for positioning using radio signals.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, some of these techniques do not result in an accurate position being determined, and others are too complex for use simply in a portable apparatus. For example, the amount of processing power required to perform the technique may be impractical to provide in a portable apparatus, which may need to perform concurrent functions.

BRIEF DESCRIPTION OF VARIOUS EMBODIMENTS OF THE INVENTION

According to various embodiments of the invention there is provided a method, comprising receiving, at an apparatus radio signals from a first location; discriminating the radio signals, in order to estimate a bearing from the first location; and estimating, using the bearing and constraint information that is independent of the radio signals, a position of the apparatus.

According to various embodiments of the invention there is provided an apparatus, comprising: a receiver configured to receive radio signals from a first location; processing circuitry configured to discriminate the radio signals, in order to estimate a bearing from the first location, and configured to estimate, using the bearing and constraint information that is independent of the radio signals, a position of the apparatus.

According to various embodiments of the invention there is provided an apparatus, comprising: means for receiving radio signals from a first location; means for discriminating the radio signals, in order to estimate a bearing from the first location; and means for estimating, using the bearing and constraint information that is independent of the radio signals, a position of the apparatus.

According to various embodiments of the invention there is provided a module, comprising: processing circuitry configured to use complex samples of further radio signals received from a first location by a receiver, in order to estimate a bearing from the first location, and configured to estimate, using the bearing and constraint information that is independent of the radio signals, a position of the receiver.

According to various embodiments of the invention there is provided a chipset, comprising: processing circuitry configured to use complex samples of further radio signals received from a first location by a receiver, in order to estimate a bearing from the first location, and configured to estimate, using the bearing and constraint information that is independent of the radio signals, a position of the receiver.

According to various embodiments of the invention there is provided a computer program, comprising: instructions for using complex samples of further radio signals received from a first location by a receiver, in order to estimate a bearing from the first location; and instructions for estimating, using the bearing and constraint information that is independent of the radio signals, a position of the receiver.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

The Figures illustrate receiving, at an apparatus 10, radio signals 50 from a first location 80; discriminating the radio signals, in order to estimate a bearing 82 from the first location 80; and estimating, using the bearing 82 and constraint information 11, 17, 182 that is independent of the radio signals 50, a position of the apparatus 10.

Figure 1:
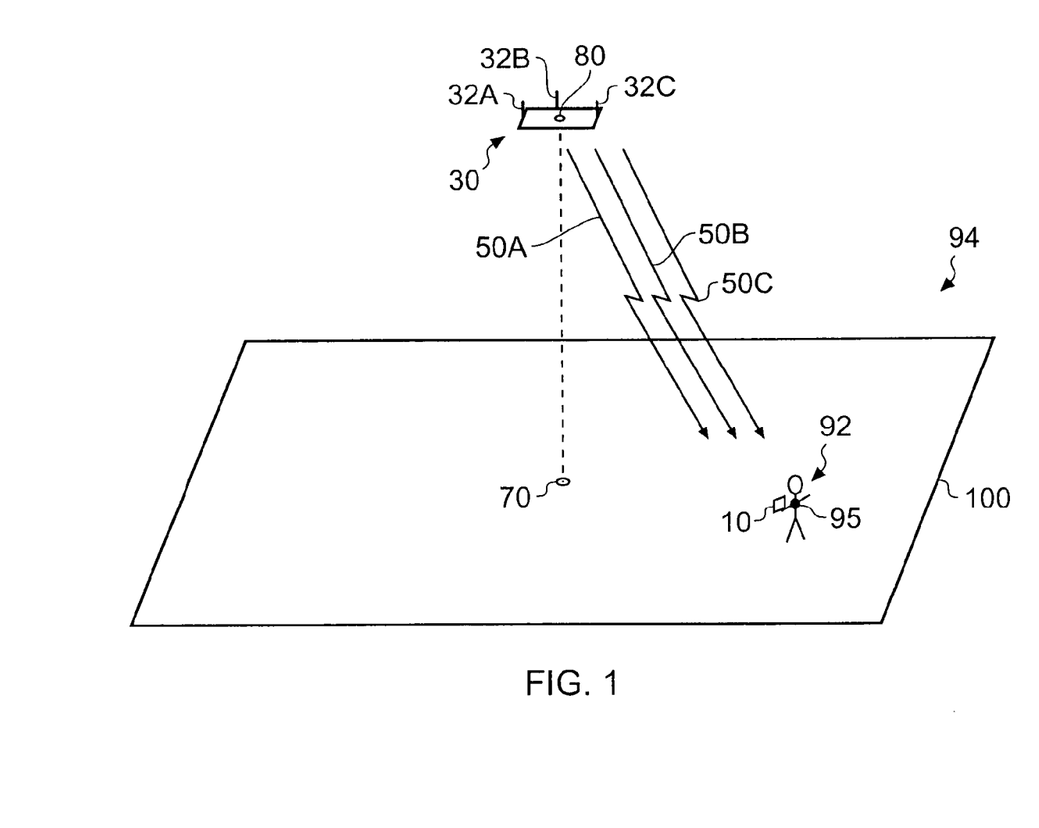
FIG. 1 illustrates an apparatus receiving radio signals from a transmitter.

FIG. 1 illustrates a person 92 (carrying a receiver apparatus 10) at a position 95 on a floor 100 of a building 94. The building 94 could be, for example, a shopping center or a conference center.

A transmitter 30 is positioned at a location 80 of the building 94. In the illustrated example, the location 80 is on the ceiling of the building 94 (i.e. the overhead interior surface) but in other implementations the transmitter may be placed elsewhere such as on a wall.

The location 80 is directly above the point denoted with the reference numeral 70 on the floor 100 of the building. The transmitter 30 is for enabling a user of an apparatus 10, such as the person 92, to determine his position 95, although that is not necessarily the only function provided by the transmitter 30. For example, the transmitter 30 may be part of a transceiver for providing wireless internet access to users of apparatuses 10, for example, via WLAN radio signals.

The position 95 of the person 92 is defined by specifying a position along a bearing 82 (illustrated in FIG. 4) which runs from the location 80 of the transmitter 30 through the location 95 of the apparatus 10, The bearing 82 is defined by an elevation angle $\theta$ and an azimuth angle $\phi$.

Figure 2A:
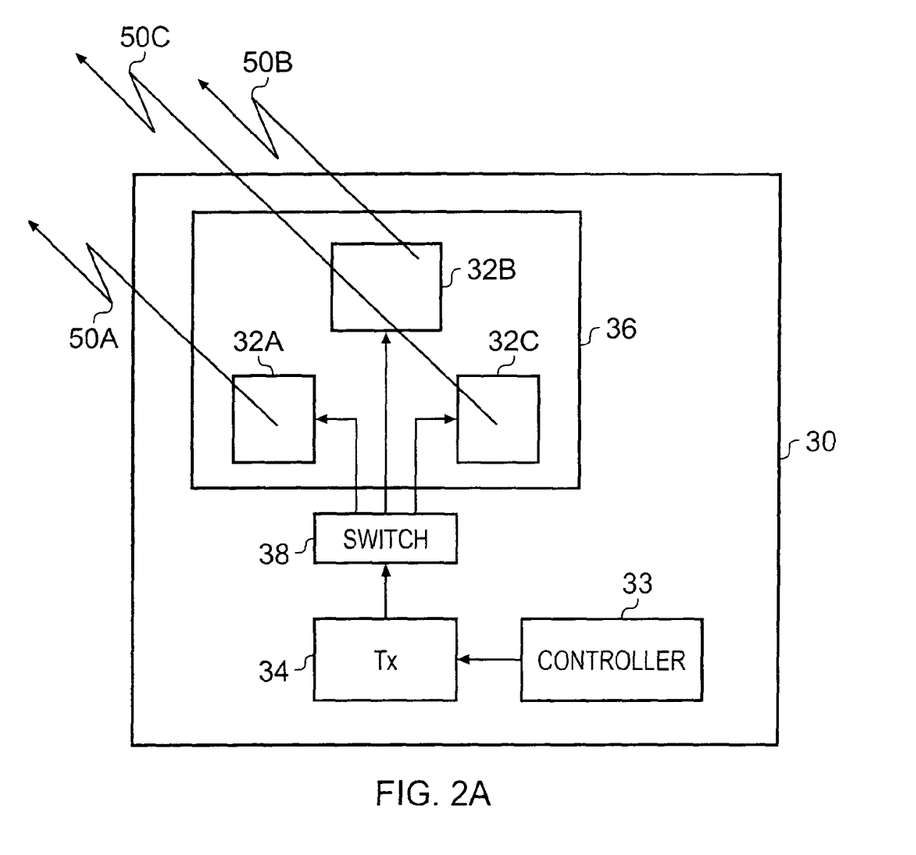
FIG. 2A is a schematic of a transmitter apparatus.

FIG. 2A schematically illustrates one example of the transmitter 30. The transmitter 30 comprises a controller 33, transmitter circuitry 34 and an antenna array 36 comprising a plurality of antenna elements 32A, 32B, 32C which transmit respective radio signals 50A, 50B, 50C . . . .

The radio signals 50 may be transmitted periodically as beacons by the transmitter 30.

In the illustrated example, separate signals 50 are transmitted via the array 36 of antenna elements 32 in a time division multiplexed fashion. A switch 38 is used to connect each one of the antenna elements 32 to the transmitter circuitry 34 one at a time, in a predefined order. The radio signals 50A, 50B, 50C from the different antenna elements 32A, 32B, 32C are therefore transmitted sequentially in different slots of a frame.

In the Figure only three different displaced antenna elements 32 are illustrated, although in actual implementations more antenna elements 32 may be used. The working prototype uses 16 patch antenna elements distributed over the surface of a hemisphere. Three is the minimum number of radio signals required at the receiver apparatus 10 to be able to determine a bearing 82.

In other embodiments, there may be a separate transmitter circuit 34 associated with each antenna element 32. In this embodiment, it may be possible to transmit two or more of the signals 50 in parallel.

Each signal 50 has a characteristic that enables it to be discriminated by the receiver apparatus 10. The characteristic may be a feature of the signal itself such as a code sequence that has been modulated onto a carrier wave or it may be a feature of the signal's position relative to the other signals such as its 'slot' number within a frame. In the latter case, all of the signals in the slots of a frame may have the same or different code sequences.

The receiver apparatus 10 needs to obtain 'displacement information' from the received signals 50A, 50B, 50C that is dependent upon the relative displacements of the respective antenna elements 32A, 32B, 32C. In the example described in detail below, the displacement information is phase information.

In one embodiment, it may be possible to modulate a carrier wave using convolution codes, as in code division multiple access. Explicit displacement information may then be determined at a receiver apparatus 10 by correlating the expected code against the received signal 50.

One disadvantage of this approach is that the resolution required for the displacement information to be able to resolve relative spatial separation between the antenna elements 32 of a few centimeters would require a very high chip rate e.g. of the order 10 GHz and a correspondingly large bandwidth and a correspondingly accurate clock.

One advantage of this approach is that knowledge of how the array 36 of antenna elements 32 transmits is not required at the receiver as the displacement information is determined from data encoded onto the carrier rather than from a property of the carrier itself.

Another simpler embodiment, modulates the carrier wave using I-Q modulation, also known as quadrature phase shift modulation. In this modulation technique, two orthogonal carrier waves (sine and cosine) are independently amplitude modulated to define a symbol. At the receiver apparatus 10, the amplitude of the two orthogonal carrier waves is detected as a complex sample and the closest matching symbol determined. It should be appreciated that an identical signal transmitted from different antenna elements will be received with different phases because of the inherent phase characteristics of the antenna elements 32 when transmitting in different directions and also because of the additional time of flight for a signal 50 from one antenna element to reach the receiver apparatus 10 compared to another signal 50. The inherent presence of this 'time of flight' information within the phases of the received signals 50 enables the received signals 50 to be processed, as described in more detail below, to determine the bearing 82 of the receiver apparatus 10 from the transmitter 30.

One advantage of this approach is that the resolution required for the displacement information to be able to resolve relative spatial separation between the antenna elements 32 of a few centimeters would require a carrier frequency of the order 10 GHz but a much lower modulation rate may be used and therefore correspondingly small bandwidth and slower clock can be used.

One disadvantage of this approach is that knowledge of how an antenna array 36 transmits is required at the receiver apparatus 10 as the inherent displacement information is determined from a property (phase) of the carrier itself and antenna elements 32 typically transmit with different phase offsets at different angles. This knowledge may take the form of an array transfer function.

Figure 2B:
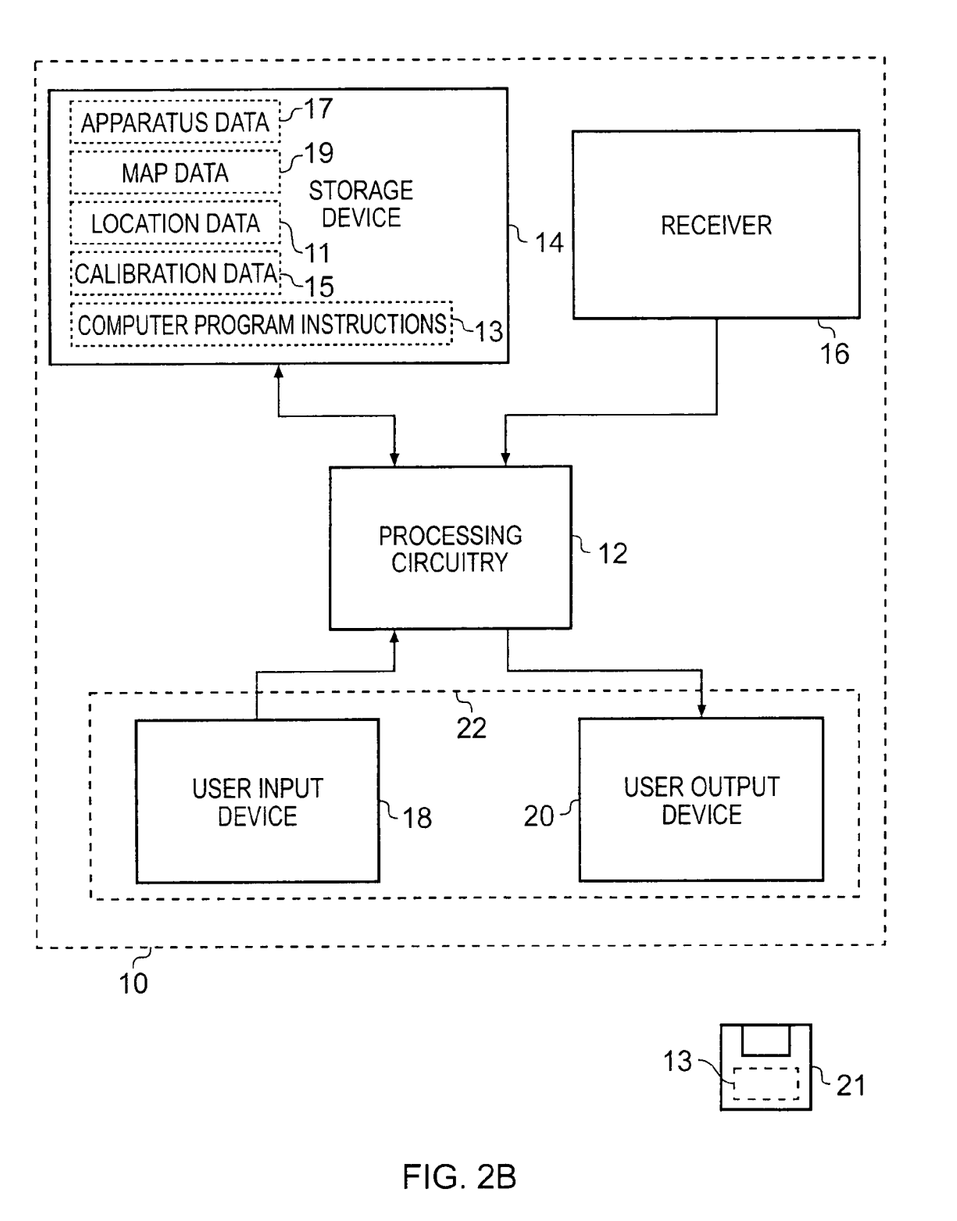
FIG. 2B is a schematic of a receiver apparatus.

FIG. 2B illustrates a schematic of a receiver apparatus 10. The apparatus 10 may, for example, be a hand portable electronic device such as a mobile radiotelephone. The apparatus 10 comprises processing circuitry 12, a storage device 14, a receiver 16, a user input device 18 and a user output device 20.

The processing circuitry is used to discriminate between radio signals 50 received from a first location 80 by the receiver 16, estimate a bearing 82 from the first location 80; and estimate, using the bearing 82 and constraint information that is independent of the radio signals 50, a position of the apparatus 10.

The portable apparatus itself does not need to transmit to determine its position. Furthermore it alone may perform the processing necessary to determine a bearing 82 and to estimate, using the bearing and constraint information, the position of the apparatus 10 along the bearing 82.

The processing circuitry 12 may be any type of processing circuitry. For example, the processing circuitry 12 may be a programmable processor that interprets computer program instructions 13 and processes data. Alternatively, the processing circuitry 12 may be, for example, programmable hardware with embedded firmware. The processing circuitry 12 may be a single integrated circuit or a set of integrated circuits (i.e. a chipset). The processing circuitry 12 may also be a hardwired, application-specific integrated circuit (ASIC).

It will be appreciated by those skilled in the art that, for clarity, the processing circuitry is described as being a separate entity to the receiver. However, it will be understood that the term processing circuitry may relate not only to a main processor of an apparatus, but also processing circuitry included in a dedicated receiver chipset, and even to a combination of processing circuitry included in a main processor and a dedicated receiver chipset.

A chipset for performing embodiments of the invention may be incorporated within a module. Such a module may be integrated within the apparatus 10, and/or may be separable from the apparatus 10.

The processing circuitry 12 is connected to receive an input from the receiver 16. The receiver 16 is configured to receive radio frequency signals. The radio signals may, for instance, have a transmission range of 100 meters or less. For example, the radio frequency signals may be 802.11 wireless local area network (WLAN) signals, Bluetooth signals, Ultra wideband (UWB) signals or Zigbee signals.

The processing circuitry 12 is connected to write to and read from the storage device 14. The storage device 14 may be a single memory unit or a plurality of memory units.

The storage device 14 may store computer program instructions 13 that control the operation of the apparatus 10 when loaded into processing circuitry 12. The computer program instructions 13 may provide the logic and routines that enables the apparatus to perform the method illustrated in FIG. 3.

The computer program instructions 13 may arrive at the apparatus 10 via an electromagnetic carrier signal or be copied from a physical entity 21 such as a computer program product, a memory device or a record medium such as a CD-ROM or DVD.

The computer program instructions 13 provide: instructions for discriminating 210 between radio signals 50 received from a first location 80 by the receiver 16, in order to estimate 220 a bearing 82 from the first location 80; and instructions for estimating 230, using the bearing 82 and constraint information 11, 17, 182 that is independent of the radio signals 50, a position of the receiver 16.

The processing circuitry 12 is connected to receive an input from the user input device 18. The processing circuitry 12 is also connected to provide an output to the user output device 20. The user output device 20 is for conveying information to a user and may be, for example, a display device. The user input device 18 and the user output device 20 together form a user interface 22. The user interface 22 may be provided as a single unit, such as a touch screen display device.

Figure 3:
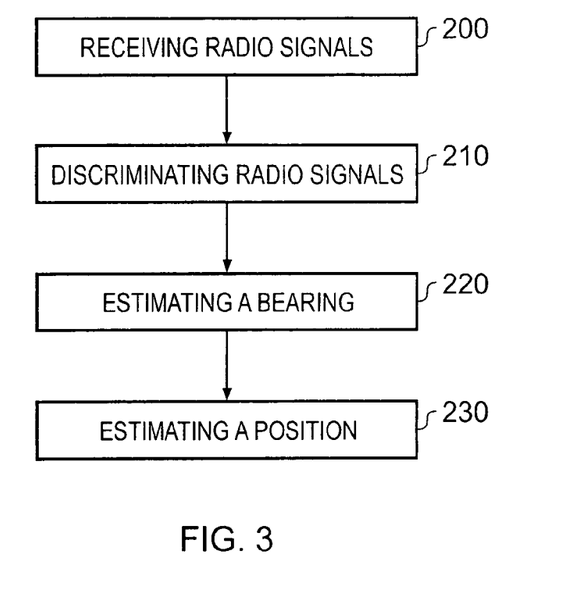
FIG. 3 is a flow diagram of a method of estimating a position of the apparatus.

FIG. 3 illustrates a method for estimating the position of the apparatus 10. Various embodiments of the method of FIG. 3 will be described hereinafter in relation to FIGS. 4 to 8.

In the following it will be assumed that the respective radio signals 50A, 50B, 50C are sent in different slots of a TDMA frame and that the same code is modulated onto the signals using IQ modulation, in this case Binary Phase Shift Key (BPSK) modulation as it is the most robust. It will be appreciated that in other embodiments different types of signals may be used and different methods of discriminating the signals will be required.

At block 200 of the method of FIG. 3, the receiver 16 of the apparatus 10 receives radio signals 50 including first, second and third radio signals 50A, 50B, 50C.

At block 210, the processing circuitry 12 of the apparatus 10 discriminates between the respective radio signals 50. In this example, this may be achieved by identifying which slot in the TDMA frame the signal was received in. At least three respective radio signals 50A, 50B and 50C will need to be discriminated.

The processing circuitry 12 obtains comparable complex samples (i.e. samples that represent same time instant) for the three respective radio signals 50A, 50B, 50C.

In some embodiments of the invention, the transmitter 30 may transmit calibration data 15 in a radio signal to the apparatus 10 for storage in memory 14, before the transmission of the radio signals 50, to enable the processing circuitry 12 of the apparatus 10 to discriminate between the radio signals 50. The calibration data 15 may, for example, be transmitted periodically as a beacon signal by the transmitter 30. In the described example, the calibration data 15 may include discrimination data that identifies the code used to modulate the signals, information about the TDMA frame, and possible information identifying the IQ modulation used and antenna array calibration data that includes information that defines the transfer function of the antenna array 36.

The calibration data 15 may be encrypted. A key to decrypt the calibration data 15 may be available from a remote server. For example, if the transmitter 30 is part of a transceiver for providing internet access, the decryption key may be obtainable from a remote server that is accessible via the transceiver. In an embodiment where the apparatus 10 also functions as a mobile telephone, the decryption key may be obtainable from a remote server connected to a mobile telephone network.

Alternatively, the calibration data 15 itself may be available from a remote server via a mobile telephone network, rather than from the transmitter 30.

At block 220, the processing circuitry 12 estimates a bearing 82. One method of determining the bearing 82 is now described, but other methods are possible.

Once comparable complex samples (i.e. samples that represent same time instant) from each antenna element 32 are obtained the array output vector y(n) (also called as snapshot) can be formed at by the processing circuitry 12.

$$y(n) = [x_1, x_2, \ldots, x_M]^T, \quad (1)$$

Where $x_i$ is the complex signal received from the ith TX antenna element 32, n is the index of the measurement and M is the number of TX elements 32 in the array 36.

A Direction of Departure (DoD) can be estimated from the measured snapshots if the complex array transfer function $a(\phi,\theta)$ of the TX array 36 is known, which it is from calibration data 15.

The simplest way to estimate putative DoDs is to use beamforming, i.e. calculate received power related to all possible DoDs. The well known formula for the conventional beamformer is $$P_{BF}(\varphi, \theta) = a^*(\varphi, \theta) \hat{R} a(\varphi, \theta), \quad (2)$$

Where, $$\hat{R} = \frac{1}{N} \sum_{n=1}^{N} y(n) y^*(n)$$

is the sample estimate of the covariance matrix of the received signals, $a(\phi,\theta)$ is the array transfer function related to the DoD$(\phi,\theta)$, $\phi$ is the azimuth angle and $\theta$ is the elevation angle.

Once the output power of the beamformer $P_{BF}(\phi,\theta)$ is calculated in all possible DoDs the combination of azimuth and elevation angles with the highest output power is selected to be the bearing 82.

The performance of the system depends on the properties of the TX array 36. For example the array transfer functions $a(\phi,\theta)$ related to different DoDs should have as low correlation as possible for obtaining unambiguous results.

Correlation depends on the individual radiation patterns of the antenna elements 32, inter element distances and array geometry. Also the number of array elements 32 has an effect on performance. The more elements 32 the array 36 has the more accurate the bearing estimation becomes. In minimum there should be at least 3 antenna elements 32 in planar array configurations but in practice 10 or more elements should provide good performance.

Next, at block 230 the processing circuitry 12 estimates a position of the apparatus 10 using the bearing and constraint information.

Figure 4:
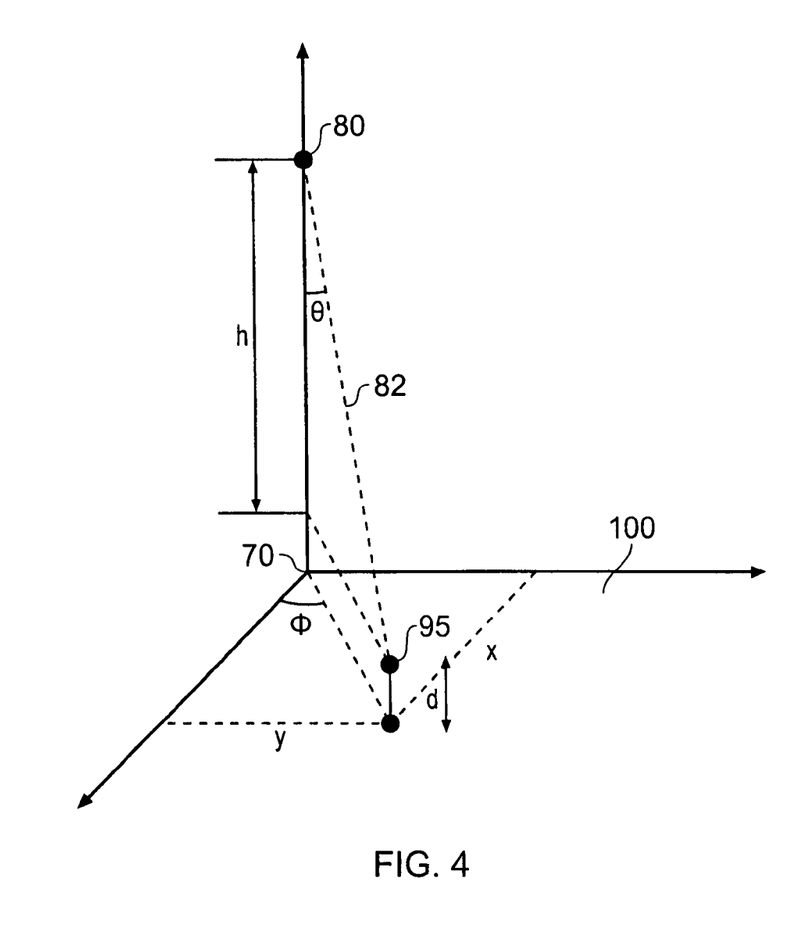
FIG. 4 illustrates a schematic for estimating the position of the apparatus.
Figure 5:
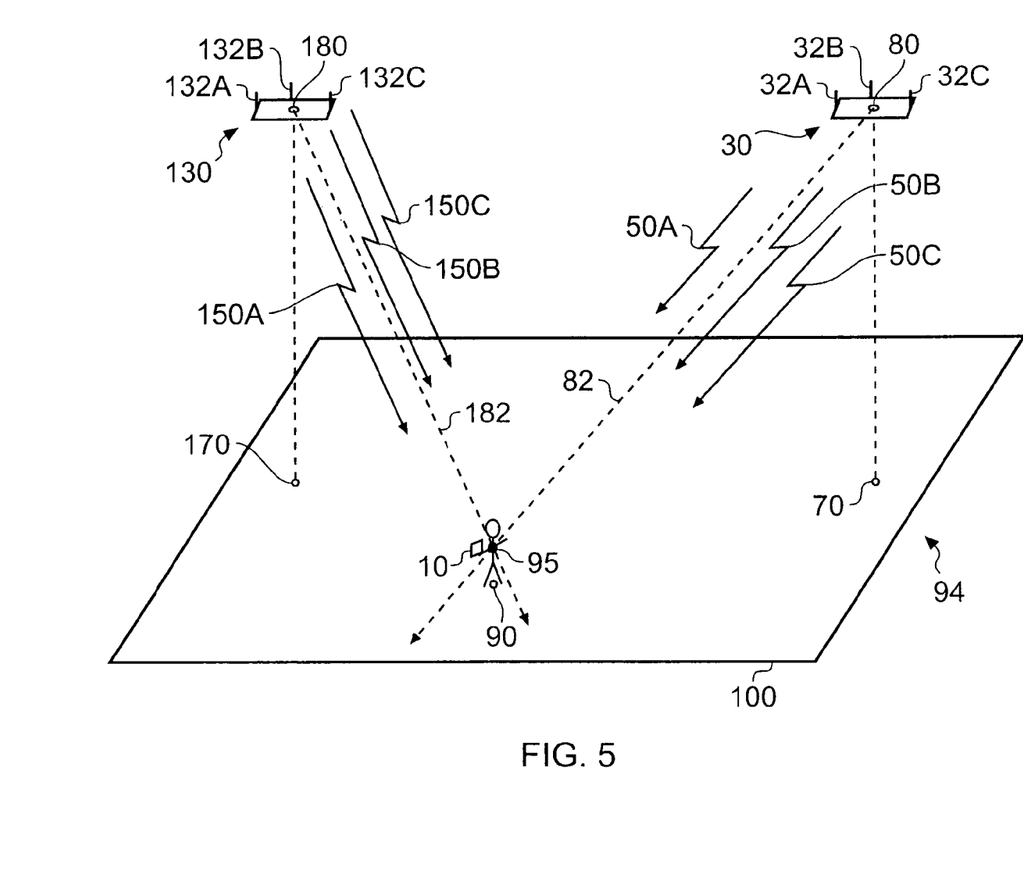
FIG. 5 illustrates first and second bearings being used to position the apparatus.

In some embodiments of the invention, such as those illustrated in FIGS. 4 and 5, the use of constraint information enables the processing circuitry 12 to determine the location of the apparatus 10 along the estimated bearing 82.

The storage device 14 may store apparatus data 17 which indicates a vertical displacement d from the ground floor 100 to the apparatus 10. The value for the vertical displacement may or may not be input by the user. For instance, the storage device 14 may be pre-loaded with a predetermined value for the apparatus data 17 (e.g. 1.2 meters) or the apparatus data 17 may be received in a radio signal from the transmitter 30.

The storage device 14 may also store map data 19 which corresponds to a map of the building 94, and location data 11 which indicates the location of the transmitter 30 on the map. The map data 19 and/or location data 11 may be obtained from the transmitter 30. Alternatively, the map data and/or the location data 11 may be obtained from a remote server, either via the transmitter 30 (e.g. where the transmitter 30 is part of a transceiver which provides access to the internet) or via a mobile telephone network.

Referring now to FIG. 4, as the vertical displacement d from the ground floor 100 to the apparatus 10 is given by the apparatus data 17, and the vertical displacement z from the ground floor 100 to the location 80 of the transmitter 30 is given by the location data 11, the processing circuitry 12 may estimate the vertical displacement h=z−d from the position 95 of the apparatus 10 to the location 80 of the transmitter 30.

FIG. 4 also illustrates the bearing 82 from the location 80 of the transmitter 30 to the location 95 of the apparatus 10, which has been estimated by the processing circuitry 12 following reception of the radio signals 50. The bearing 82 is defined by an elevation angle θ and an azimuth angle φ.

The processing circuitry 12 may estimate the position of the apparatus 10 relative to the location 80 of the transmitter 30 in coordinates using the bearing (elevation angle θ, azimuth angle φ) and constraint information (vertical displacement h). The processing circuitry 12 may estimate the position of the apparatus 10 in Cartesian coordinates by converting the coordinates using trigonometric functions.

Once the processing circuitry 12 has estimated the position of the apparatus 10 relative to location 80 of the transmitter 30, it is able to estimate the position of the apparatus 10 on the map because the location 80 of the transmitter 30 on the map is known from the location data 11. The processing circuitry 12 may control the user output device 20 to display the map and to indicate to the user the position of the apparatus 10 on the map.

FIG. 5 illustrates a building 94 having two transmitters 30, 130 located on the ceiling of the building 94 in this example. The two transmitters 30, 130 are of the same form as that of the transmitter 30 described in relation to in FIG. 1. The first transmitter 30 is positioned at a location 80 on the ceiling, directly above the point denoted with the reference numeral 70 on a floor 100 of the building 94. The second transmitter 130 is position at a location 180 on the ceiling, directly above the point denoted with the reference numeral 170 on the floor 100. The separation of the transmitters 30, 130 is large in comparison with the separation of the antenna elements 32 or 132 with their respective arrays.

In this embodiment, the apparatus 10 receives radio signals 50 from the first transmitter 30 and determines a bearing 82 of the apparatus 10 from the first transmitter 30 as described in relation to blocks 200, 210, 220 of FIG. 3. The bearing 82.

The apparatus 10 also receives radio signals 150 from the second transmitter 130 and determines, as constraint information, a bearing 182 of the apparatus 10 from the first transmitter 30 using the method as described in relation to blocks 200, 210, 220 of FIG. 3. The discrimination of the radio signals 150A, 150B, 150C at block 210 and the estimation of the bearing 182 will require second calibration data including, for example, the transfer function of the antenna array used by the second transmitter 130.

The apparatus 10 may receive second calibration data from the second transmitter 130.

Once the bearings 82 and 182 have been estimated, the processing circuitry 12 may estimate that the apparatus 10 is situated at a position along bearing 82 as defined by the constraining bearing 182. It may be that processing circuitry 12 estimates an area that the apparatus 10 is likely to be positioned in if the accuracy of the bearings 82, 182 is such that the processing circuitry 12 is not able to pinpoint the position of the apparatus 10 with a high degree of precision. Once the position of the apparatus 10 has been estimated, the processing circuitry 12 may control the user output device 20 to convey the estimated position to the user.

Figure 6:
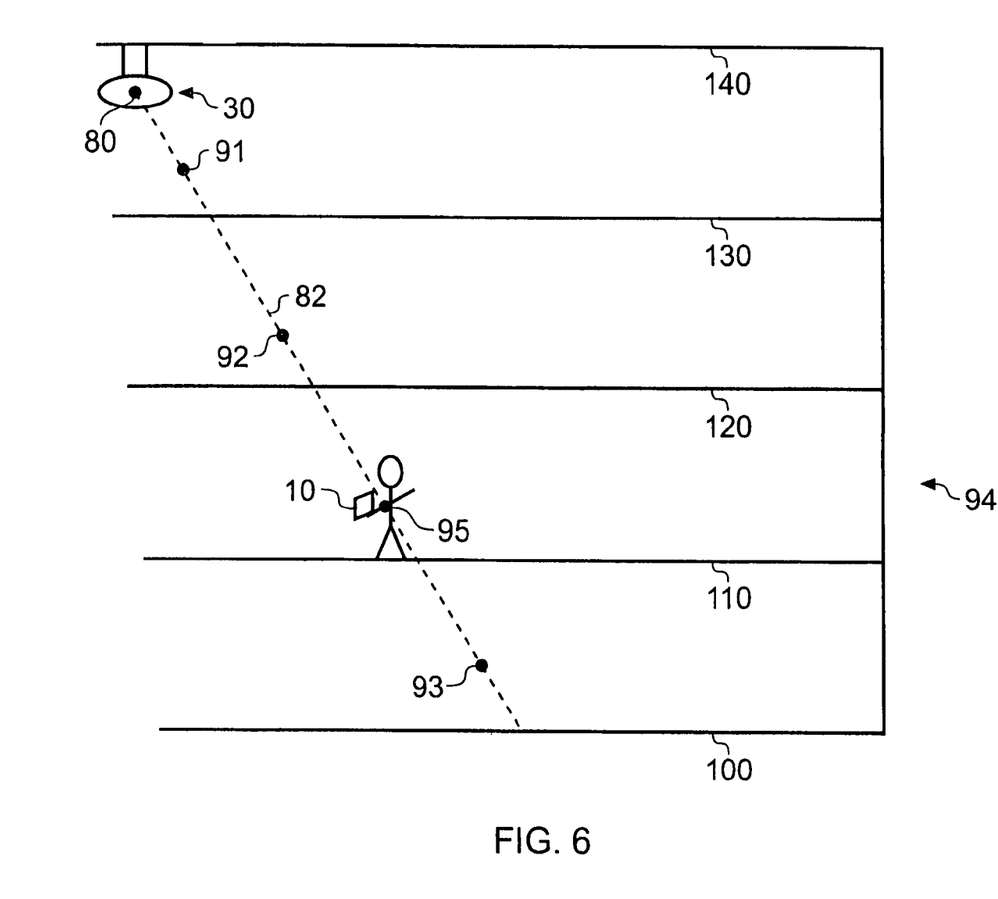
FIG. 6 illustrates possible positions of the apparatus on a bearing in a multi-floor environment.

FIG. 6 illustrates a transmitter 30 located on a ceiling 140 of a building 94. In this particular example, the building 94 has four floors 100, 110, 120, 130. A bearing 82 from the location 80 of the transmitter 30 has been estimated using radio signals 50 in the manner described above in relation to FIGS. 1 and 3.

Having estimated the bearing 82, the processing circuitry 12 determines that there are four possible positions 91, 92, 93, 95 of the apparatus 10. In this example, it is assumed that the radio signals 50 are able to penetrate the upper three floors 110, 120 and 130 such that it is possible that the user is positioned on any of the floors 100, 110, 120 and 130. However, it may be that the map data 19 stored in the storage device 14 indicates to the processing circuitry 12 that radio signals from the transmitter 30 do not reach certain floors, for example, the ground floor 100. This enables the processing circuitry 12 to discount the position 93 adjacent the ground floor 100 as a possible position of the user.

In order to determine the position of the apparatus 10 in relation to the estimated bearing 82, the processing circuitry 12 may control the user output device 20 to display a query asking the user which floor he is on before his position is estimated. The processing circuitry 12 is able to compare the information input by the user with the map data 19 to determine which floor of the building the user is situated on. For example, the user may indicate that he can see a particular shop on the floor that he is on. The processing circuitry 12 may then compare this input information with the map data 19 to determine which floor the user is on. In the example illustrated in FIG. 6, the user indicates that he is situated on the first floor 110. In this embodiment, therefore, the user provides "constraint information" which enables his position to be determined.

Once the processing circuitry 12 has determined that the user is on the first floor 110, it is able to estimate the position of the apparatus 10 using the same techniques as those mentioned in relation to FIG. 4. In the case illustrated in FIG. 6, the processing circuitry 12 is able to estimate the vertical displacement from the apparatus 10 to the transmitter 30 by using the known displacement from the first floor 110 of the building to the ceiling 140 (given by the location data 11 stored in the storage device 14), and by using the vertical displacement from the first floor 110 to the apparatus 10 (given by the apparatus data 17).

Figure 7:
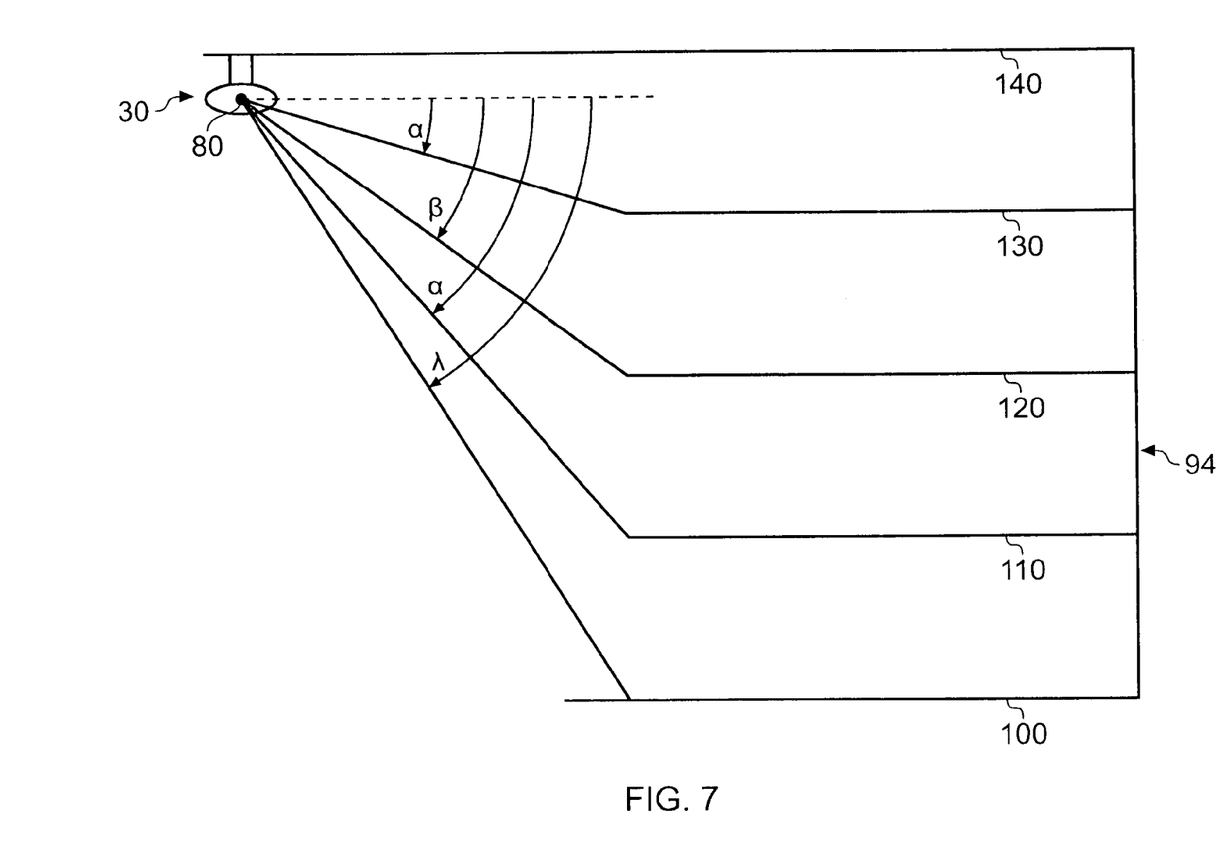
FIG. 7 illustrates determining a position of the apparatus in a multi-floor environment.

In the example illustrated in FIG. 7, the radio signals 50 are assumed or known not to penetrate each floor 110, 120, 130 of the building. The processing circuitry 12 of the apparatus 10 may determine a bearing from the location 80 of the transmitter 30 on the ceiling 140 of the building 94 to the apparatus 10 using the techniques described in relation to FIGS. 1 and 3.

The location data 11 stored in the storage device 14 may include data which relates particular elevation angles with certain floors of the building 94. For example, if a bearing having an elevation angle from 0 to α is estimated by the processing circuitry 12, it indicates that the apparatus 10 is positioned on the top floor 130. A bearing having an elevation angle from α to β indicates that the apparatus 10 is on the second floor 120. A bearing having an elevation angle from β to α indicates that the apparatus 10 is on the first floor 110. A bearing having an elevation angle from α to λ indicates that the apparatus is on the ground floor 100.

The processing circuitry 12 compares the elevation angle of the estimated bearing with the location data 11, and estimates which floor the apparatus 10 is situated on, thus estimating a position of the apparatus 10. The processing circuitry 12 then controls the user output device 20 to convey this information to the user. In this example, a position of the apparatus 10 is estimated by using an estimated bearing and constraint information. "Constraint information" is provided by the portion of the location data 11 that that relates particular angles of elevation to particular floors of the building.

Figure 8:
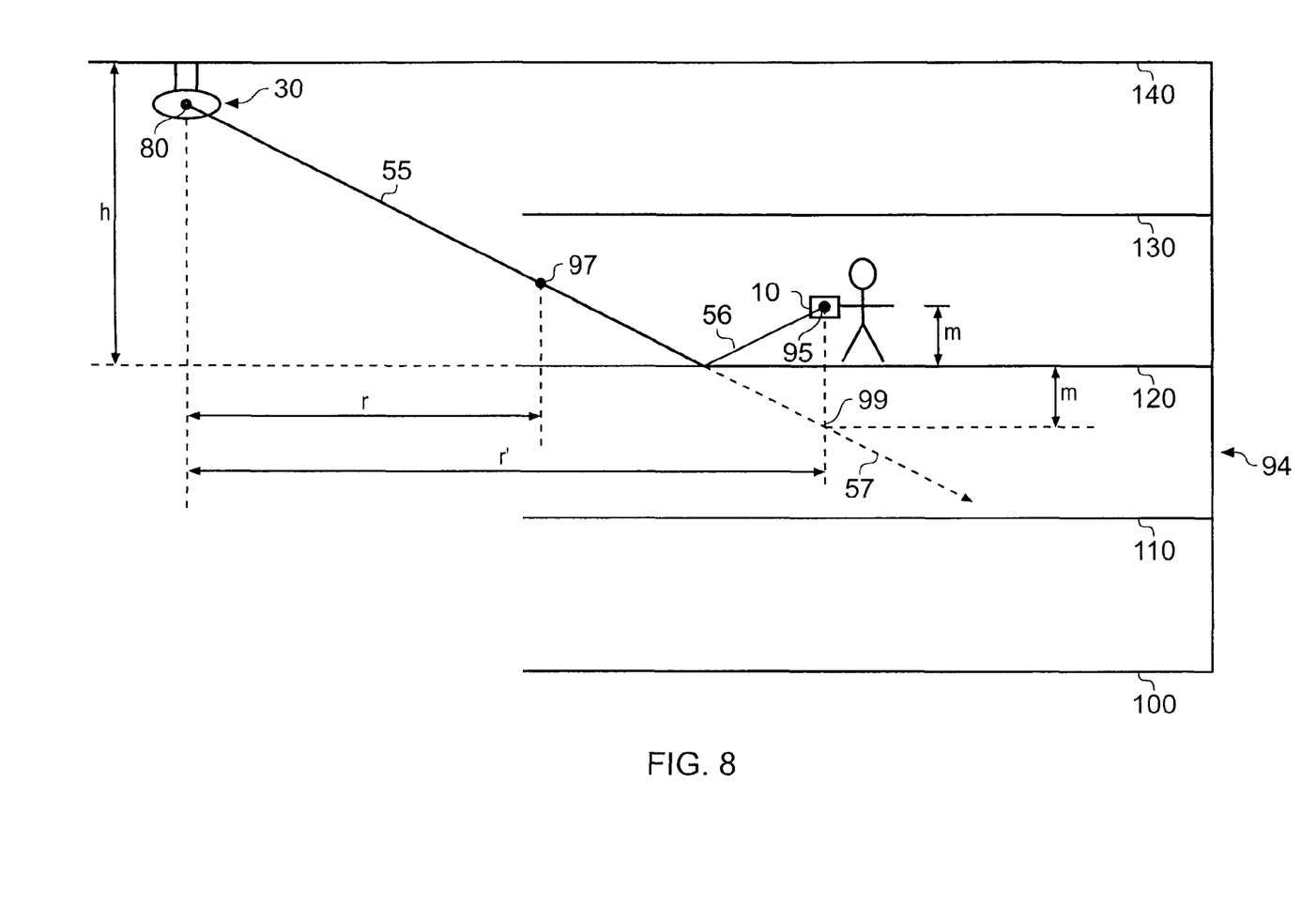
FIG. 8 illustrates determining a position when radio signals are reflected.

FIG. 8 illustrates a situation where the user is positioned on the second floor 120 and the radio signals 50 transmitted by the transmitter 30 are reflected by the second floor 120. For ease of explanation, the radio signals 50 are shown following a common path 55, 56 from the transmitter 30 to the apparatus 10.

If the processing circuitry 12 estimates a bearing from the location 80 of the transmitter 30 using the techniques described above in relation to FIGS. 1 and 3, the estimated bearing will not take into account the reflection of the radio signals from the second floor 120 and will therefore follow the solid line 55 and the dotted line 57. However, it can be seen from FIG. 8 that the apparatus 10 is not positioned on this bearing.

In embodiments of the invention illustrated the example illustrated in FIG. 8, the processing circuitry 12 may be configured to determine whether the line of sight between the apparatus 10 and the transmitter 30 is blocked by determining if a reflection of the received radio signals 50 has occurred. This enables the processing circuitry 12 to determine whether an estimation of the bearing from the location 80 of the transmitter 30 to the apparatus 10 is likely to be accurate.

When the radio signals 50 are reflected from a dielectric surface, the polarization of the signals 50 may change. The apparatus 10 may detect this change in polarization to determine whether a signal has been reflected, and to determine whether a correction to an estimated bearing is required.

Another way of determining if a reflection has occurred might be to determine whether the received signal strength intensity (RSSI) of one or more of the radio signals 50 is below a threshold. If the RSSI is below the threshold, the signal(s) is/are assumed to have been reflected.

Reference numeral 97 denotes the position that the processing circuitry 12 would estimate the apparatus 10 to be at, if it did not take into consideration that a reflection of the radio signals 50 had occurred. In the example illustrated in FIG. 8, the incorrect position 97 is separated in both a vertical sense and a horizontal sense from the location 80 of the transmitter 30. A distance r separates the incorrect position 97 from the location 80 of the transmitter 30 in the horizontal sense. The correct position 95 is separated from the location 80 of the transmitter 30 in a horizontal sense by a distance r'. The transmitter 30 and the second floor 120 are separated in a vertical sense by a distance h. The position of the apparatus 10 given by the apparatus data 17 is a vertical displacement m from the second floor 120. Using trigonometric identities, it can be shown that:

$$r' = \frac{h+m}{h-m} r \quad (1)$$

The processing circuitry 12 may estimate r by using radio signals transmitted by the transmitter 30, as described in relation to FIGS. 1, 3 and 4. An assumed value of m is given by the apparatus data 17 (e.g. 1.2 meters). The vertical distance h may be found using the map data 19 and the location data 11, because the location data 11 provides the location of the transmitter 30 on the map.

Using these values of r, m and h as inputs to equation (1), the processing circuitry 12 may estimate the position r' of the apparatus 10 relative to the transmitter 30. As the location data 11 indicates the location 80 of the transmitter 30 on the map stored in the storage device 14, the processing circuitry 12 is able to determine the location 95 of the apparatus 10 on the map and may control the user output device 18 to convey the position 95 of the apparatus 10 on the map to the user.

Another method of determining the distance r', other than by directly using equation (1), would be to determine the point at which the bearing 55, 57 has a downward displacement of m from the second floor 120 (i.e. the floor that the bearing 55, 57 intersects). This intersection is denoted by reference numeral 99 on FIG. 8.

It has been demonstrated that, in embodiments of the invention as described above in relation to FIGS. 2 to 8, an apparatus 10 may estimate its position without having to transmit radio signals to a receiver located in the building 94. This is particularly advantageous because it is possible for the apparatus 10 to remain anonymous from the radio equipment of the building 94.

The blocks illustrated in the FIG. 3 may represent steps in a method and/or sections of code in the computer program 13. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed. For example, the apparatus 10 may not function as a mobile telephone. It may, for example, be a portable music player having a receiver for receiving radio signals.

Various examples of constraint information have been given in the preceding paragraphs, but the term "constraint information" it is not intended to be limited to these examples.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   receiving at an apparatus and from a first location at least:
      a first radio signal transmitted by a first antenna element,
      a second radio signal transmitted by a second antenna element and a third radio signal transmitted by a third antenna element;
   discriminating between the at least first, second and third radio signals received at the apparatus from the first location;
   receiving location information related to the first location;
   determining, from the received at least first, second and third radio signals displacement information that is dependent upon the relative displacements of the at least first, second and third antenna elements;

with a processor, estimating a single bearing using:
   the discriminated at least first, second and third radio signals, and
   the displacement information; and
estimating a position of the apparatus using:
   the single bearing,
   the location information related to the first location, and
   constraint information, wherein the constraint information is different from the location information related to the first location and is determined independently of the received at least first, second and third radio signals.

2. A method as claimed in claim 1, further comprising: estimating a further bearing using at least fourth, fifth and sixth radio signals, received at the apparatus from a second location; and
using the further bearing as the constraint information to estimate the position of the apparatus.

3. A method as claimed in claim 1, wherein the constraint information relates to a vertical displacement associated with the apparatus.

4. A method as claimed in claim 3, wherein the constraint information is: stored in the apparatus, input by a user or received from a remote server.

5. A method as claimed in claim 1, further comprising receiving data, from the first location or a remote server, to enable the first, second and third radio signals to be discriminated from one another.

6. A method as claimed in claim 1, wherein a relative displacement between the first, second and third antenna elements is used to estimate the single bearing from the first location.

7. A method as claimed in claim 1, wherein a relative difference in time of reception between the received first, second and third radio signals is used to estimate the single bearing from the first location.

8. A method as claimed in claim 1, further comprising determining whether a line of sight between the apparatus and the first location is blocked, and estimating the position of the apparatus differently in dependence upon the determination.

9. A method as claimed in claim 1, wherein a position of the first location is known on a map, and estimating the position of the apparatus includes locating the apparatus relative to the first location using the estimated single bearing.

10. An apparatus configured to:
receive from a first location at least: a first radio signal transmitted by a first antenna element, a second radio signal transmitted by a second antenna element and a third radio signal transmitted by a third antenna element;
receive location information related to the first location; and
determine, from the received at least first, second and third radio signals, displacement information that is dependent upon the relative displacements of the at least first, second and third antenna elements;
the apparatus comprising:
processing circuitry:
   configured to discriminate between the at least first, second and third radio signals received at the apparatus from the first location;
   configured to estimate a single bearing using:
      the discriminated first, second and third radio signals, and
      the displacement information; and
   configured to estimate a position of the apparatus using:
      the single bearing,
      the location information related to the first location, and
      constraint information, wherein the constraint information is different from the location information related to the first location and is determined independently of the received at least first, second and third radio signals.

11. An apparatus as claimed in claim 10, wherein the processing circuitry is configured to:
estimate a further bearing using at least fourth, fifth and sixth radio signals received from a second location; and
use the further bearing as the constraint information to estimate the position of the apparatus.

12. An apparatus as claimed in claim 10, where the constraint information relates to a vertical displacement associated with the apparatus.

13. A system comprising: a transmitter configured to transmit first, second and third radio signals, and an apparatus as claimed in claim 10.

14. A non-transitory computer readable storage medium storing a computer program comprising computer program instructions that, when executed by processing circuitry of an apparatus, causes the apparatus to perform:
receiving from a first location at least: a first radio signal transmitted by a first antenna element, a second radio signal transmitted by a second antenna element and a third radio signal transmitted by a third antenna element;
discriminating between the at least first, second and third radio signals received at the apparatus from the first location;
receiving location information related to the first location;
determining, from the received at least first, second and third radio signals, displacement information that is dependent upon the relative displacements of the at least first, second and third antenna elements;
estimating a single bearing using:
   the discriminated first, second, and third radio signals, and
   the displacement information; and
estimating a position of the apparatus using:
   the single bearing,
   the location information related to the first location, and
   constraint information, wherein the constraint information is different from the location information related to the first location and is determined independently of the received at least first, second and third radio signals.

15. A non-transitory computer readable storage medium as claimed in claim 14, where the constraint information relates to a vertical displacement associated with the receiver.

16. An apparatus as claimed in claim 10, wherein the constraint information is: stored in the apparatus, input by a user or received from a remote server.

17. An apparatus as claimed in claim 10, further comprising:
a receiver configured to receive first second and third radio signals from a first location.

18. An apparatus as claimed in claim 10, further comprising at least one memory storing computer program code, wherein the at least one memory and stored computer program code are configured, with the processing circuitry, to cause the apparatus to at least:
discriminate between the first, second and third radio signals;
estimate the bearing using the discriminated first, second and third radio signals; and estimate, using the single bearing, the location information related to the first location and constraint information that is independent of the received first, second and third radio signals, a position of the apparatus.

19. A method as claimed in claim 1 wherein the received at least first, second and third radio signals have a transmission range of 100 meters or less.

20. An apparatus as claimed in claim 10 wherein the received at least first, second and third radio signals have a transmission range of 100 meters or less.

21. A method as claimed in claim 1 wherein the displacement information is:
  derived from phase information of the received at least first, second and third signals, or
  encoded in the received at least first, second and third radio signals.

* * * * *